M. MAAG.

GEAR CUTTING MACHINE.

APPLICATION FILED DEC. 22, 1919.

Reissued July 6, 1920.

14,908.

7 SHEETS—SHEET 1.

Inventor

Max Maag

By S. Jay Teller

Attorney

M. MAAG.

GEAR CUTTING MACHINE.

APPLICATION FILED DEC. 22, 1919.

Reissued July 6, 1920.

14,908.

7 SHEETS—SHEET 2.

Inventor
Max Maag
By S. Jay Teller
Attorney

M. MAAG.

GEAR CUTTING MACHINE.

APPLICATION FILED DEC. 22, 1919.

Reissued July 6, 1920.

14,908.

7 SHEETS—SHEET 3.

Inventor
Max Maag
By
S. Jay Teller
Attorney

M. MAAG.
GEAR CUTTING MACHINE.
APPLICATION FILED DEC. 22, 1919.
Reissued July 6, 1920.
14,908.
7 SHEETS—SHEET 4.
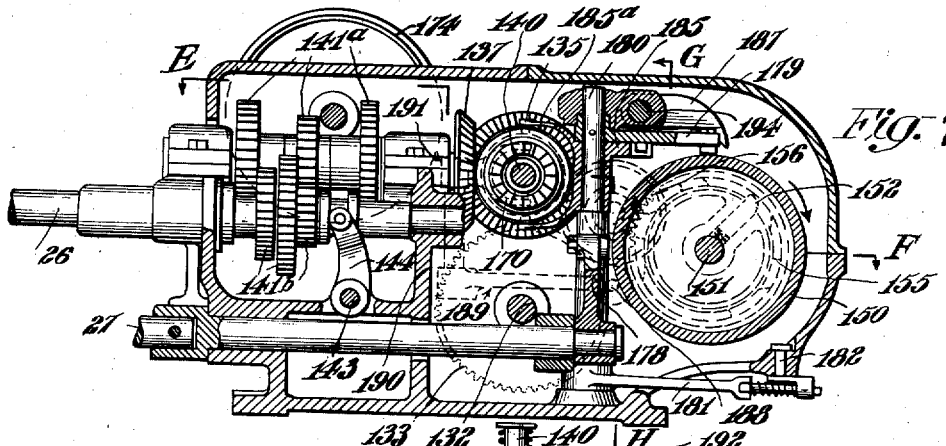
Fig. 7.
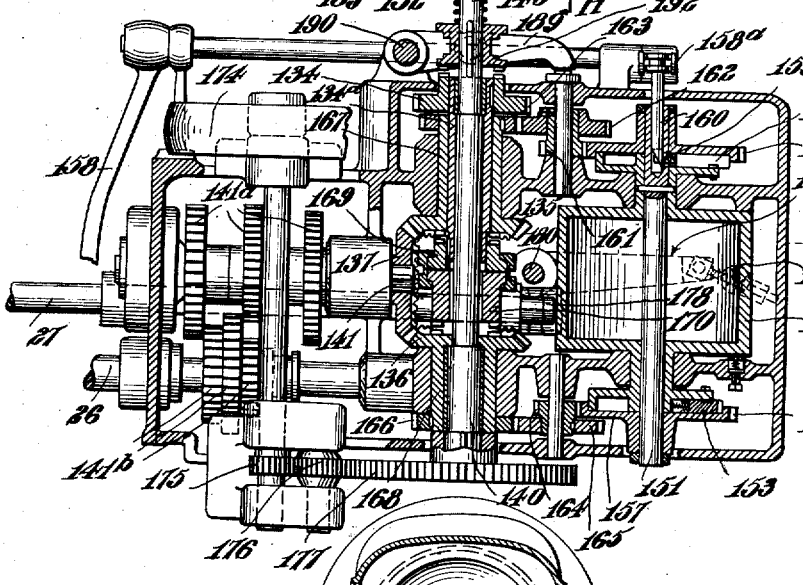
Fig. 8.
Fig. 4.
Inventor
Max Maag
By
S. Jay Teller
Attorney M. MAAG.
GEAR CUTTING MACHINE.
APPLICATION FILED DEC. 22, 1919.
Reissued July 6, 1920.
14,908.
7 SHEETS—SHEET 5.
Fig. 5,
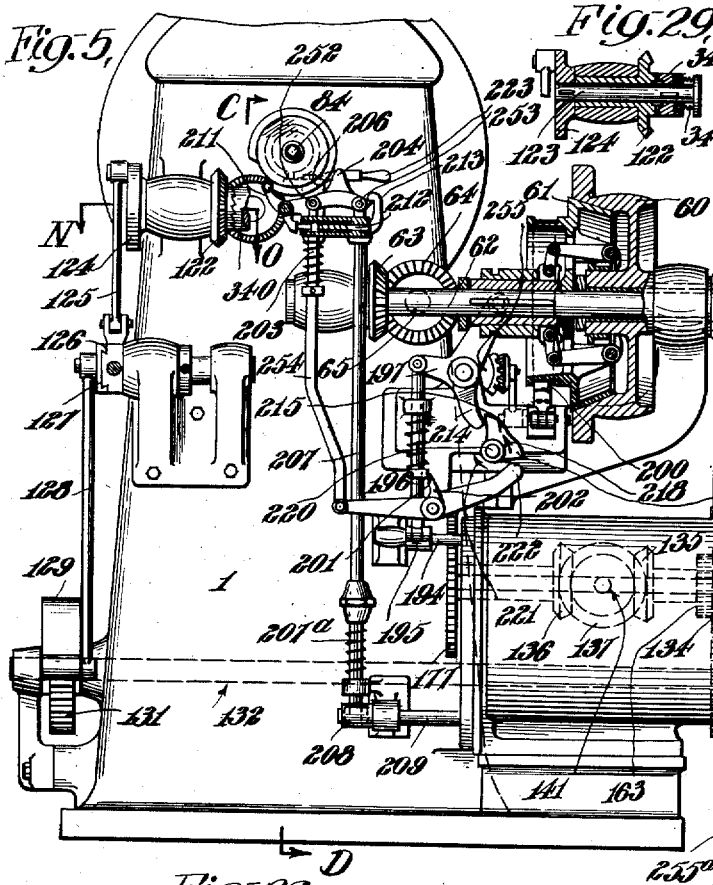
Fig. 29,
Fig. 6,
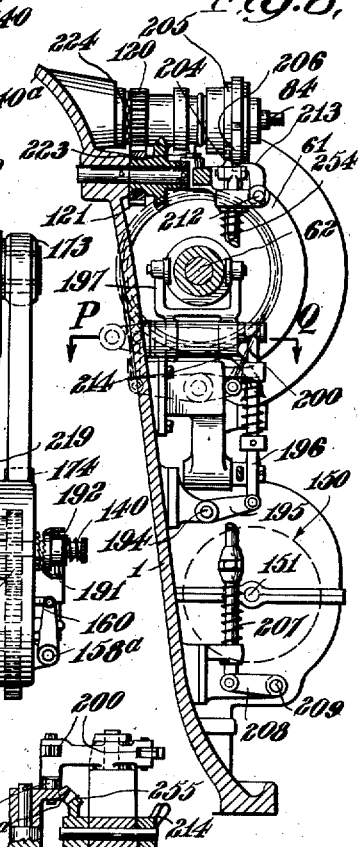
Fig. 26,
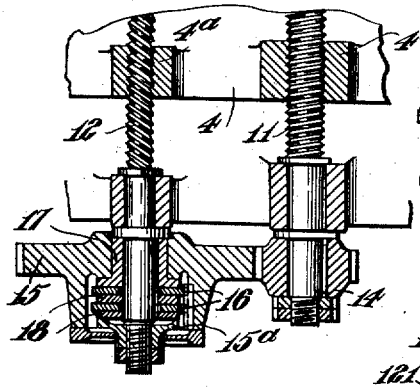
Fig. 27,
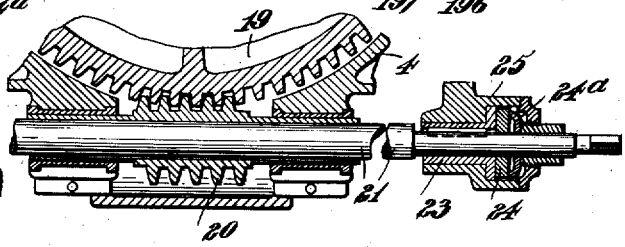
Fig. 30,
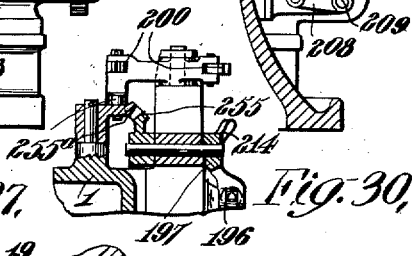
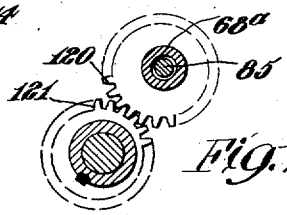
Fig. 28,
Inventor
Max Maag
By L. Jay Teller
Attorney M. MAAG.
GEAR CUTTING MACHINE.
APPLICATION FILED DEC. 22, 1919.
Reissued July 6, 1920.
14,908.
7 SHEETS—SHEET 6.
Fig. 19,
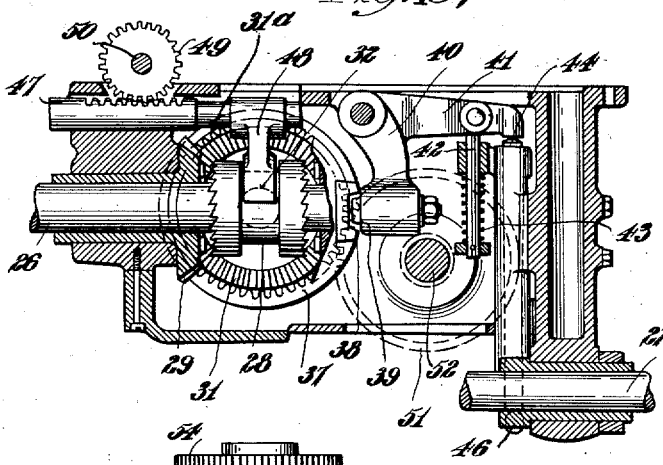
Fig. 21,
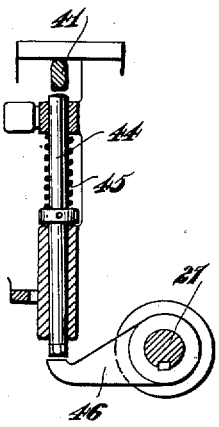
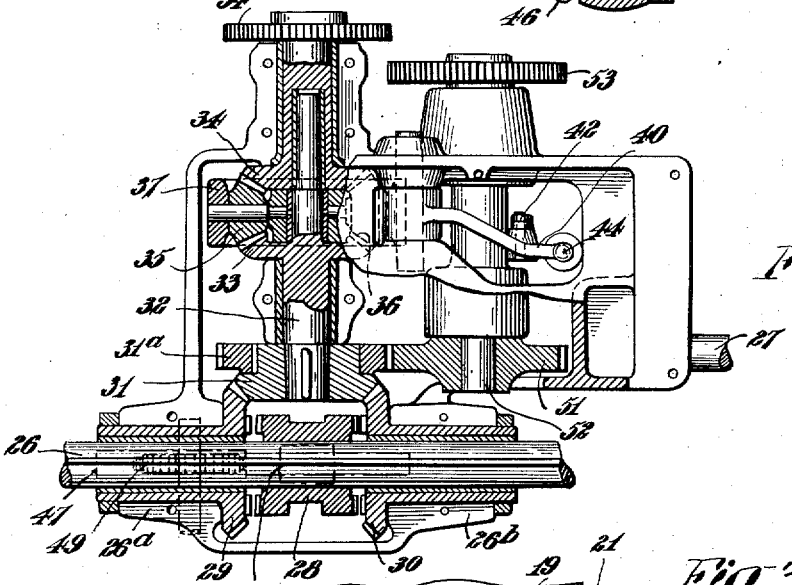
Fig. 20,
Fig. 31,
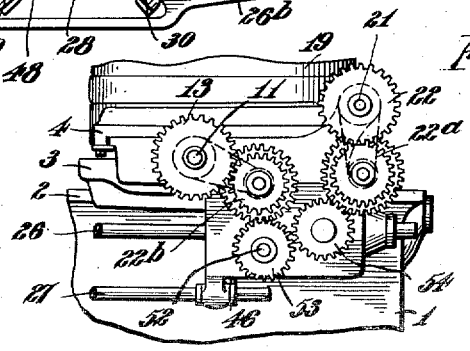
Inventor
Max Maag
By L. Jay Teller
Attorney M. MAAG.
GEAR CUTTING MACHINE.
APPLICATION FILED DEC. 22, 1919.
Reissued July 6, 1920.
14,908.
7 SHEETS—SHEET 7.
Fig. 23,
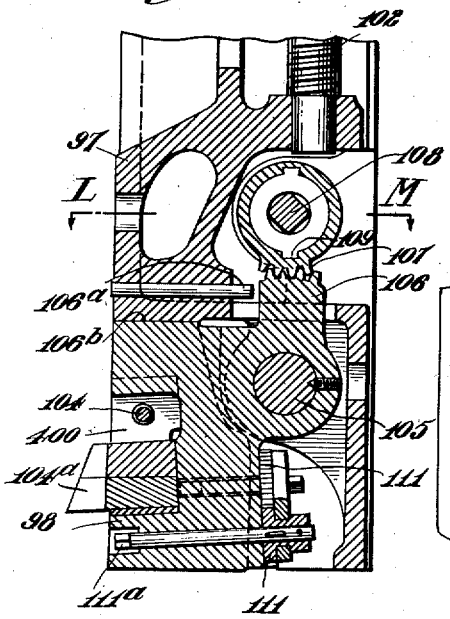
Fig. 22,
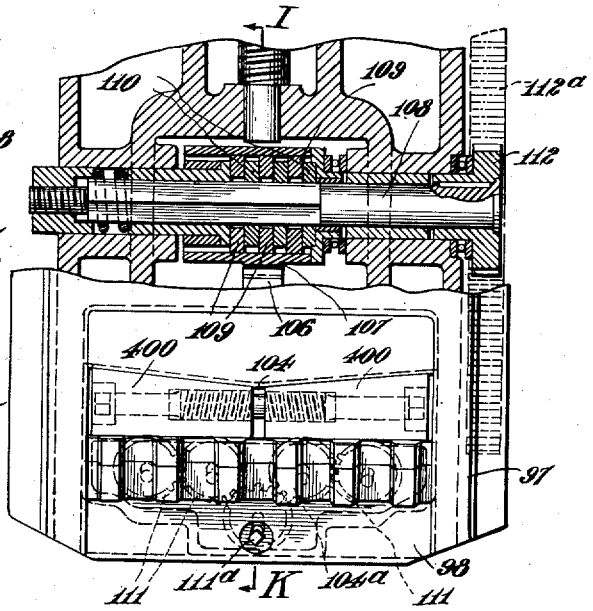
Fig. 24,
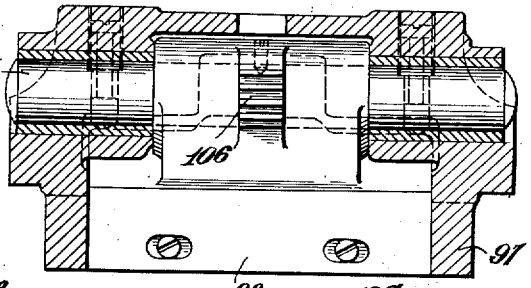
Fig. 25,
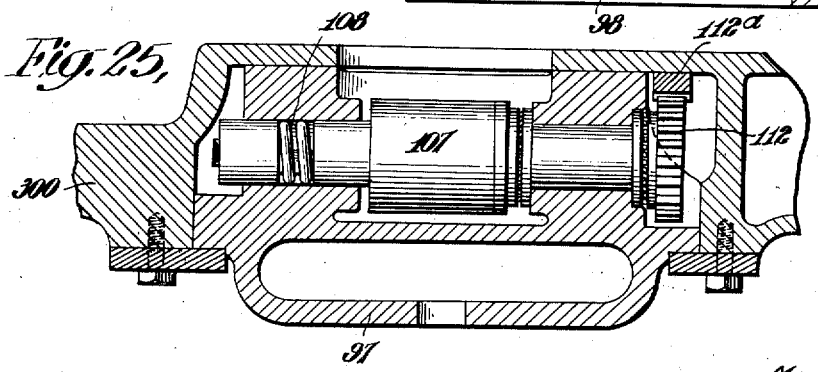
Inventor
Max Maag
By
H. Jay Teller
Attorney

UNITED STATES PATENT OFFICE.

MAX MAAG, OF ZURICH, SWITZERLAND.

GEAR-CUTTING MACHINE.

14,908. Specification of Reissued Letters Patent. Reissued July 6, 1920.

Original No. 1,290,270, dated January 7, 1919, Serial No. 115,469, filed August 17, 1916. Application for reissue filed December 22, 1919. Serial No. 346,790.

*To all whom it may concern:*

Be it known that I, MAX MAAG, a citizen of the Republic of Switzerland, residing at Zurich, Hardstrasse 219, Switzerland, have invented certain new and useful Improvements in Gear-Cutting Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a machine for cutting spur-, screw- and double helical spur-wheels, which works according to the rolling principle. The multiple-tooth cutter or rack form of this machine receives a reciprocating movement, while the blank is carrying out its whole rolling movement. While the teeth are cut, the blank receiving simultaneously a revolving movement, is moved so long in the longitudinal direction of the cutter of rack form until one or more teeth are completely finished, whereupon said blank is moved back past the cutter to an amount corresponding to the number of teeth, which are completely cut, the cutter being inoperative during this backard movement of the blank. In addition to the movements specified the blank is given an additional backward and forward rolling movement to take up play.

The object of the invention is to provide a machine having the characteristics and capable of carrying out the operations as outlined above.

This invention will now be more particularliy described with reference to the accompanying drawings, which illustrate a constructional example of the invention.

In these drawings:—

Fig. 4 is a section on the line A—B of Fig. 1.,

Fig. 5 is a rear elevation, partly in section, of the machine,

Fig. 6 is a section on the line C—D of Fig. 5.,

Figure 9:
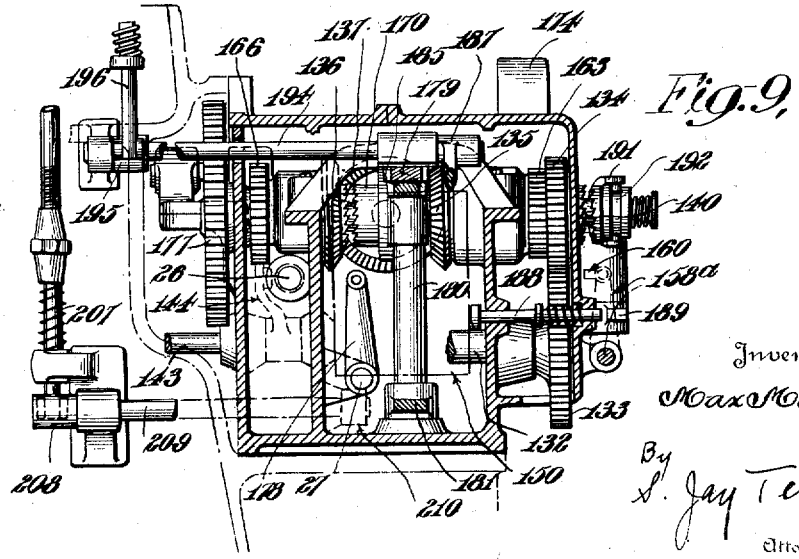

Fig. 7 is a vertical section through a box containing parts of a control mechanism, Fig. 8 is a section on the line E—F of Fig. 7., Fig. 9 is a section on the line G—H of Fig. 7., Fig. 10 is a plan view of a detail of said control mechanism, Fig. 11 is a side view of a further detail of this mechanism, Figs. 12 and 13 are a side view and a development, respectively, of a control drum and levers acted upon by this drum, Fig. 14 illustrates diagrammatically the sequence and the duration of the movements controlled by said drum, which are imparted to the table carrying the blank;

Figs. 15, 16, 17 and 18 illustrate details of the mechanism for driving said control drum, the details shown in Figs. 15 and 16 being arranged on one side of the drum and the details shown in Figs. 17 and 18 on the opposite side thereof, Fig. 19 is a vertical section through a mechanism for moving the table carrying the blank and arranged within a table box, Fig. 20 is a corresponding horizontal section and Fig. 21 illustrates a detail of this mechanism.

Fig. 22 is a front elevation, partly in section, of the tool- or cutter-ram,

Fig. 23 is a section on the line I—K of Fig. 22.,

Fig. 24 illustrates the supports for the movable cutter holder,

Fig. 25 is a section on the line L—M of Fig. 23,

Fig. 26 is a detail of the mechanism for reciprocating the table carrying the blank, Fig. 27 is a detail of that part of this mechanism, which effects the revolving movement of said table, Fig. 28 is a detail of the feed mechanism of the machine, Fig. 29 is a section on the line N—O of Fig. 5., Fig. 30 is a section on the line P—Q of Fig. 6., and Fig. 31 is a side view of the change-gearings of the mechanism effecting the movement of the table carrying the blank.

The machine forming the subject matter of the present invention comprises a number of different mechanisms, which I shall now describe.

One of these mechanisms is the:

*Mechanism for moving the blank.*

Figure 1:
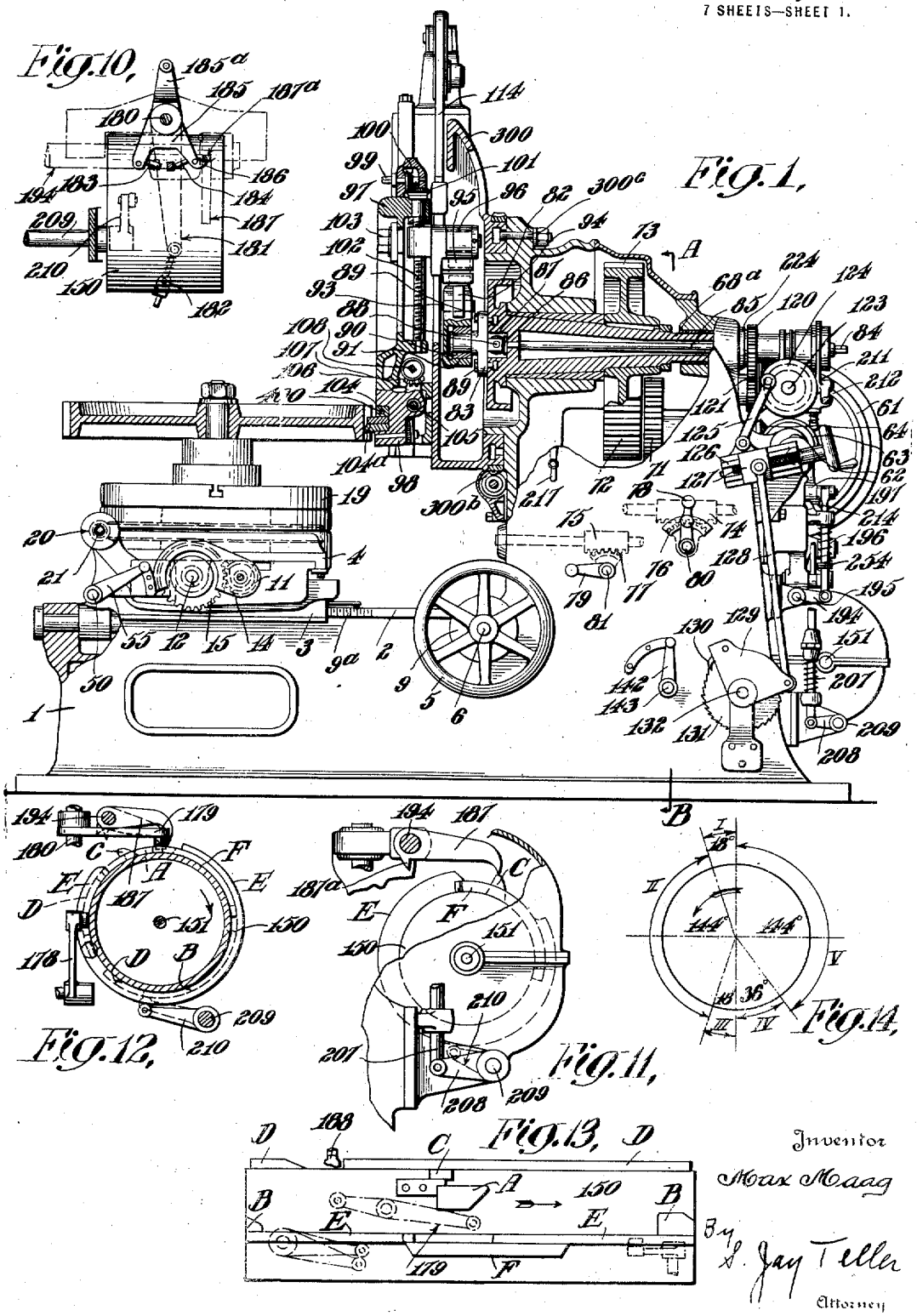
Figure 1 is a side view, partly in section, of the machine.
Figure 2:
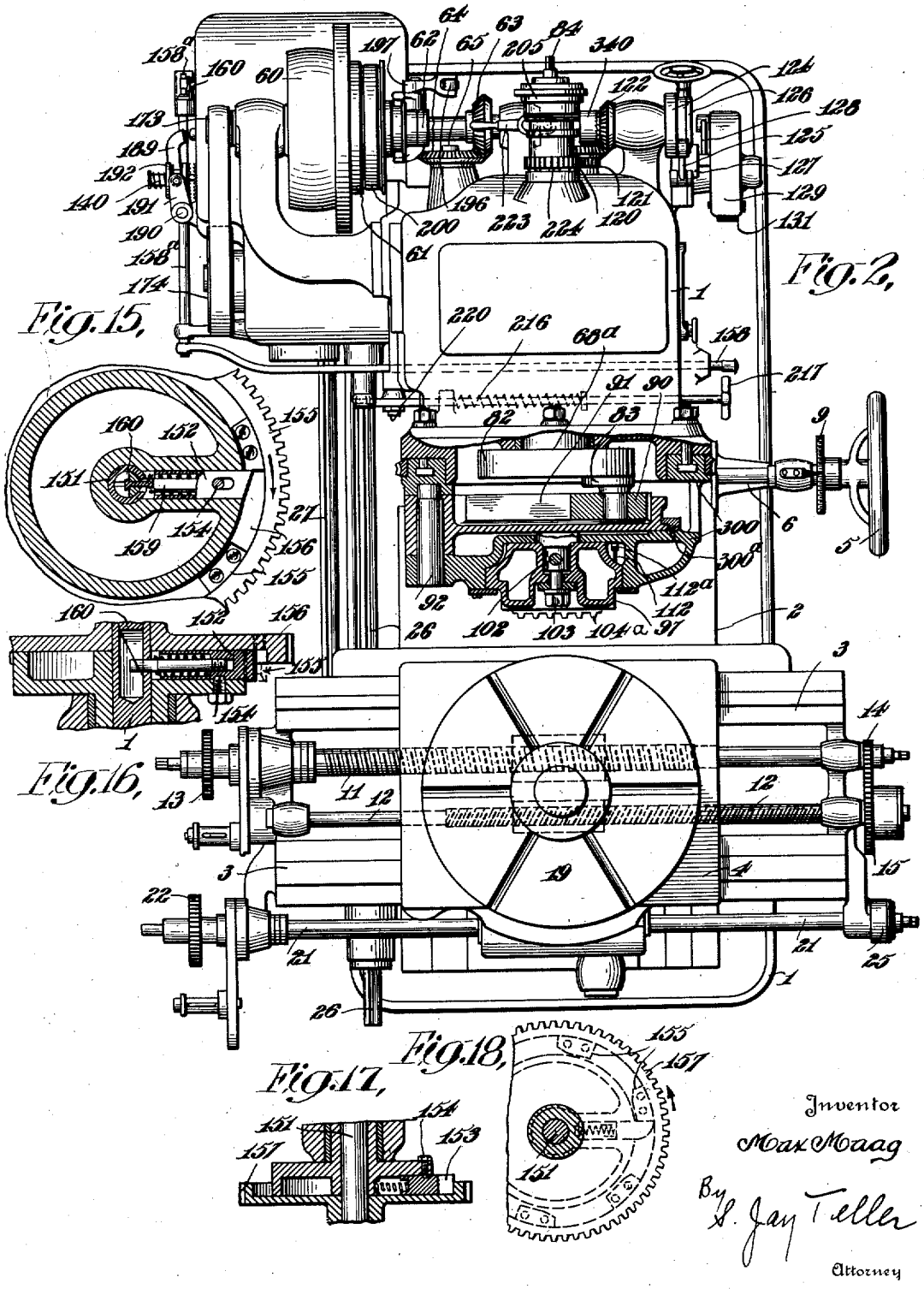
Fig. 2 is a plan view of this machine, showing also certain parts in section.

The standard 1 of the machine (Figs. 1, 3, 4) has a slide 2 for the longitudinal slide 3 (Figs. 1, 2). The latter carries a guide for the cross slide 4. The lower slide 3 may be adjusted by means of a hand-wheel 5 (Figs. 1, 2, 3), spindle 6, bevel-gearing 7 (Fig. 3) and a screw spindle 8. To control the amount of this adjustment I provide a wheel 9 (Figs. 1, 2) having a division and a scale 9[a] (Fig. 1) with vernier fixed to the guide 2 for the slide 3. A drag mechanism comprising screw spindles 11 and 12, which are provided with a right-handed and a left-handed thread respectively, effects the movement of the slide 4 in the transverse direction. The screw-thread of the spindle 11 has a smaller pitch than the screw-thread of the spindle 12 and said spindle 11 carries a spur-wheel 13 (Figs. 2 and 31). Both these spindles 11, 12 mesh with nuts 4[a] (Fig. 26) fixed to the slide 4. The other end of the spindle 11 carries a spur-wheel 14, which meshes with a spur-wheel 15 (Figs. 1, 2, 26). The latter is loose on a sleeve 17 (Fig. 26). This sleeve 17 and a number of friction disks 18 are rigidly connected to the spindle 12, while friction disks 16 are rigidly connected to the wheel 15. These disks 16 and 18 may be pressed against one another by means of an adjustable part 15[a]. Thus, it will be seen now, that on a rotation of the spindle 11 the spindle 12 is also rotated owing to the friction produced between said disks, the speed of rotation of the spindle 12 being thereby smaller than that of the spindle 11, as the diameter of the wheel 15 is considerably greater than that of wheel 14. In any case the movement of spindle 12 is always determined by the movement imparted to the slide 4 brought about by the spindle 11, said spindle 12 taking up the play between the spindle 11 and the nut 4[a] meshing with the latter.

The cross slide 4 carries the round table 19 (Figs. 2, 3, 27) having a worm-wheel rim. The latter engages with a worm 20 (Fig. 27) adapted to slide in the key way of a shaft 21. One end of this shaft 21 carries moreover a brake device acting by friction (Fig. 27), which acts to prevent accelerations of said shaft. This brake device causes a change-gearing 22[a] (Fig. 31) operatively connected to this shaft and comprising a spur-wheel 22 (Fig. 3) to oppose a greater resistance to rotation than a pair of planet toothed wheels 35, 36 (Fig. 20) of a mechanism fitted within a table box and described more fully later on. Said brake device comprises a sleeve 23 (Fig. 27) fixed to the shaft 21 and working together with a disk 24, which is pressed against the front side of said sleeve 23 by a spring 24[a]. The disk 24 is adapted to be moved longitudinally in a key way of a stationary bush 25.

*Table box.*—The shafts 11, 12 and 21 are operatively connected in such a manner by means of two change-gearings 22[a] and 22[b] (Fig. 31), that the required rolling movement will be imparted to the blank. The control of this movement is effected by two shafts 26 and 27 (Figs. 2, 3, 7, 8, 9) extending toward the rear end of the machine. The shaft 26 actuates the change-gearings 22[a] and 22[b] referred to, while the shaft 27 carries out only a small oscillating movement. The two shafts 26, 27 are provided with key ways, as they are mounted in the slide 3. The shaft 26 is supported in two bearings 26[a], 26[b] (Fig. 20) of the table box. Between these bearings is slidably mounted on said shaft 26 a clutch-sleeve 28 having on each side a rim of clutch-teeth and adapted to be moved in the axial direction of this shaft. On each side of this sleeve 28 is also mounted on the shaft 26 a bevel-wheel 29 and 30 respectively, having each a long hub surrounding the shaft 26. Both these wheels 29 and 30 have on their inner side clutch-teeth. They mesh moreover with a bevel-wheel 31, which is rigidly connected with a spur-wheel 31[a] and fixed to a short shaft 32. The whole hereinbefore described gearing constitutes a reversing gearing for driving the shaft 32 in both directions while the shaft 26 is constantly revolving in the same direction. The shaft 32 forms so to speak the front pin of a bevel-wheel 33, the rear pin of which carries a loose bevel-wheel 34 rigidly connected to a spur-wheel 54. Between the two wheels 33, 34 are arranged two planet-wheels 35 and 36 meshing therewith, the whole forming a planet bevel-gearing. The ring 37, acting as a bearing for the wheels 35 and 36, has a hardened cam groove 38 (Fig. 19) adapted to be engaged by a pin 39 of a lever 40 (Figs. 19, 20), which is formed integral with a lever 41 (Figs. 19, 20, 21). To the lever 41 is pivotally mounted a bolt 42, which is acted upon by a spring 43. The free end of lever 41 acts upon a vertical movable bolt 44 which is pressed downward by a spring 45 (Fig. 21). This bolt 44 may be lifted by a lever 46 rigidly connected to the shaft 27.

The above mentioned clutch-sleeve 28 is moved on the shaft 26 carrying it by means of a lever 48 (Figs. 19, 20) fixed to a small shaft 47. The latter is moved in its turn in the axial direction by means of a spur-wheel 49 meshing with an end of said shaft 47 having the form of a rack. Spur-wheel 49 is fixed to a shaft 50 (Figs. 1, 3, 19, 20). The above mentioned spur-wheel 31[a] meshes with a spur-wheel 51 (Fig. 20), which is fixed to a shaft 52 carrying at its other end a spur-wheel 53 fixed thereto. This wheel 53 constitutes the driving wheel of the pitch change-gearing 22[b] (see also Fig. 31), which drives the shaft 11, while the spur-wheel 54 (Figs. 3, 20, 31) forms the driving member of the change-gearing 22[a], which drives the shaft 21. By means of a crank lever 55 (Figs. 1 and 3) fixed to the shaft 50, the clutch sleeve 28 may be clutched to either of the bevel wheels 29 or 30, or not clutched at all, corresponding to the rolling movement of the table in the two directions or the stopping of all table movement.

*Drive.*—60 (Figs. 2, 3, 5) denotes a pulley, which constitutes the main driving member of the machine and which forms at the same time the outer part of a friction clutch. The inner part 61 of this clutch is fixed to a shaft 62. To this shaft 62 is also fixed a wheel 63 of a bevel-gearing 63, 64 (Figs. 2, 5). The other wheel 64 of this gearing is mounted on a shaft 65 (Figs. 2, 4) driving a shaft 66[a] (Figs. 1, 2) through the change-wheels 66, 67, 68, 69, 70, 71, 72, 73 (Fig. 4). For the purpose of throwing these change-wheels in and out of action I provide toothed wheel-sleeves 74, 75 (Fig. 4) and pinion segments 76, 77 (Figs. 4 and 1), these segments being operatively connected to handles 78 and 79 by means of shafts 80 and 81 respectively.

Figure 3:
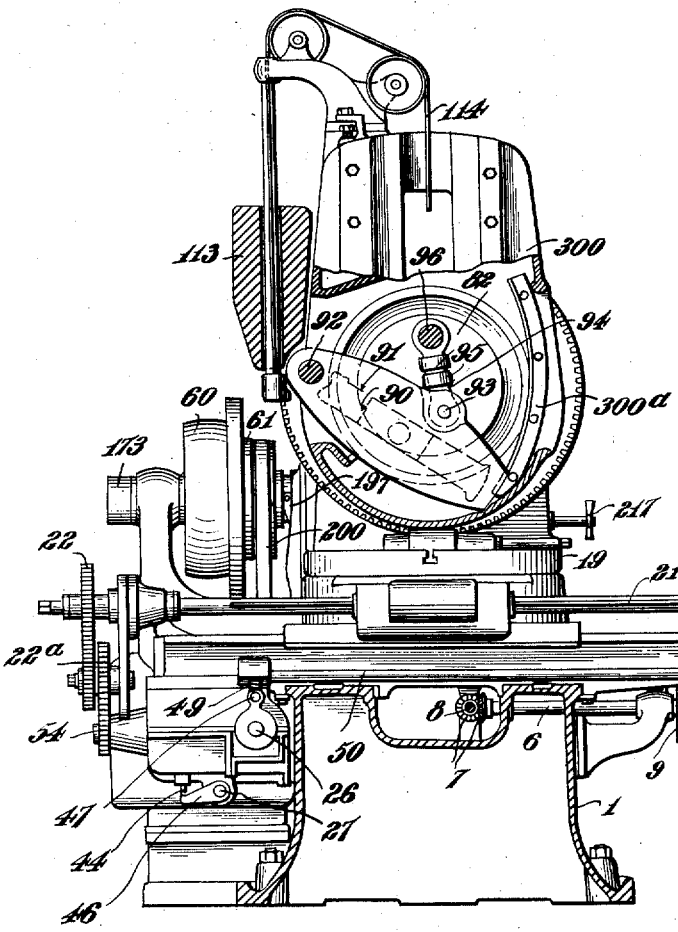
Fig. 3 is a front elevation, partly in section, of the machine.

*Cutter movement.*—The front end of the shaft 68[a], which I shall now call hereinafter the cam-disk shaft, terminates in a cam-disk 82 (Figs. 1, 2, 3). A gudgeon 83 acting as a bearing for a block 90 is adapted to be moved in a radial direction relatively to said disk 82 by means of a shaft 85 having a squared end 84 (Figs. 1, 2, 6), bevel-gearing 86, 87 (Fig. 1) and thread spindle 88. Nuts 89 serve to secure said gudgeon in determinate positions.

The block 90 (Figs. 1, 2, 3) mounted on the gudgeon 83 slides in a slot of a link 91 (Figs. 1, 2, 3) pivotally mounted on a pin 92 (Fig. 2). To a pin 93 (Fig. 3) of this link 91 is operatively connected a crank rod 94, which comprises a safety break sleeve 95 and which imparts to a ram 97 (Figs. 1, 2) a vertical reciprocating movement. In this ram 97 is pivotally mounted the cutter holder 98 (Figs. 1, 22, 23, 24). The ram may be adjusted vertically by means of a shaft 99 (Fig. 1) having a squared end, a bevel-gearing 100, 101 and a screw spindle 102, while a nut 103 (Figs. 1 and 2) serves to secure this ram in its proper position.

The pin 92 carrying the link 91 is mounted in a movable part 300 (Figs. 1 and 2), to which is secured a guide piece 300[a] (Figs. 2, 3, and 23) for said link. This part 300 has also a guide for the ram 97 and it is adapted to be moved into an oblique position for the purpose of cutting screw- and double helical spur-wheels by means of a worm gearing 300[b], in which position it may be fixed by means of screws 300[c] (Fig. 1). The cutter holder 98 carries the multiple-tooth cutter 104[a] of rack form (Fig. 2). A spindle 104 (Fig. 22) provided with a left- and right-hand thread passes through two wedges 400 (Figs. 22, 23), which upon a rotation of said spindle 104 may be moved toward one another for the purpose of fixing the cutter 104[a] in the holder 98. The upper and lower sides of said wedges 400 have also a different inclination, so that the cutter 104[a] is pressed downward on its holder 98. As the cutting tool has to be prevented from coming in contact with the blank on the return stroke, the cutter holder 98 is pivotally mounted on a pin 105 (Figs. 1, 23, 24). A toothed segment 106 (Figs. 23, 25) is formed integral with said cutter holder 98 and it meshes with a toothed part of a sleeve 107. The latter is loose on a shaft 108 (Fig. 22), but is provided with friction disks 109 fixed thereto. These disks work together with friction disks 110 keyed to the shaft 108. The latter carries on one of its ends a toothed wheel 112 which meshes with a rack 112[a] (Figs. 22, 25) connected to the guide of the ram. On a vertical movement of the ram 97 the wheel 112 meshes with said rack, it being thereby moved in the longitudinal direction of the latter, and owing to the friction produced between the disks 109 and 110 an oscillating movement is then imparted to the toothed segment 106 until the latter comes to rest either on the pin 106[a] or the surface 106[b] (Fig. 23). 111 (Figs. 22, 23) are a number of wheels adapted to be moved simultaneously for the purpose of effecting an exact parallel adjustment of the cutter 104[a] by means of a shaft 111[a] (Fig. 23). In order to eliminate all shocks, which might arise owing to the play in the driving mechanism, particularly between the link 91 and the block during the upward and downward movement of the ram 97, I connect to this ram a heavy balancing weight 113 (Figs. 3, 1) by means of a member 114.

*Feed mechanism.*—The rear end of the cam-disk shaft 68[a] carries an elliptical spur-wheel 120 (Figs. 1, 2, 6, 28) meshing with an elliptical wheel 121 mounted on a short pin. Wheel 121 is formed integral with a part having the shape of a bevel-wheel and engaging with a bevel-wheel 122 (Figs. 2, 5). This is loose on a feed shaft 123 (Fig. 29), carrying the feed crank-disk 124. The boss of the wheel 122 has clutch-teeth, which engage with corresponding teeth of a clutch-member 340 (Fig. 29) fixed to the shaft 123 and adapted to be moved in the longitudinal direction of the latter. The clutch-teeth of said members 122, 340 are caused to mesh by a spring 340[a] (Fig. 29) acting on the member 340. This clutch 122, 340 secures a proper feed, as on the occurring of trouble in the feed mechanism the teeth of the members 122, 340 are caused to disengage one another, so that the crank-disk 124 remains stationary. A short crank rod 125 connects the disk 124 to a link 126 (Figs. 1, 5). A slide 127 is adapted to be moved radially within this link 126. The movement of the slide 127 is transmitted to a plate 129 (Figs. 1, 5) by means of a rod 128. The plate 129 carries a pawl 130 adapted to engage a feed-wheel 131. Owing to the fact, that the above described link mechanism 91, 94 for moving the ram 97 effects in less than half a revolution of the shaft 68[a] an upward movement of said ram, it will be seen, that the feed movement would partly coincide with the course of work of the cutter, if the above mentioned elliptical wheels 120 and 121 (Figs. 28, 1) did not permit the shaft 123 to carry out a revolving movement, which is proportional to the feed stroke, for the purpose of effecting the feed, only during the return stroke of the ram.

*Control mechanism.*—The shaft 132 (Figs. 1, 5, 7) carrying the feed-wheel 131 has on that side of the machine, on which is mounted the pulley 60, a spur-wheel 133 (Figs. 5, 9) meshing with a spur-wheel 134 (Figs. 8, 9). This wheel 134 is rigidly connected to a sleeve 134[a] acting as a bearing for a shaft 140 (Figs. 8, 9, 15), on which is a loose bevel-wheel 136, a bevel-wheel 135 has a long sleeve 167 loose on the sleeve 134[a]. The one or the other of these bevel-wheels 135, 136 drives a bevel-wheel 137 fixed to a shaft 141 (Figs. 8, 9), which drives the shaft 26 (Fig. 8) through a spur-wheel gearing 141[a], 141[b] (Fig. 8). On the termination of a course of work, that is, after one or more pitches have been rolled past the cutter 104[a], the latter is, as already stated, stopped in its uppermost position while the blank is moved back into the new working position. Hereinafter I shall call this return movement of the blank the reversing movement. This reversing movement is started through an automatic mechanism comprising a drum 150 (Figs. 7, 8, 9, 10) and described more fully later on.

On the circumference of said drum 150 are provided a number of cams A, B, C, D, E, F, (Figs. 12, 13, 11). The drum 150 is mounted on a shaft 151 (Figs. 8, 7) and it has on each side a driving plate. Each of these plates has a driver or catch 152 and 153 respectively (see also Figs. 15, 16, 17, 18), the outermost position of which is determined by bolts 154 projecting into slots of these drivers. The outer end of each driver 152, 153 respectively has the form of a pawl and they are caused to work together with cams 155 (Figs. 15 and 18) fixed to spur-wheels 156 and 157 by springs, which tend to move these drivers in a radial direction. A pin 159 (Figs. 15, 16) arranged within the driver 152 may be retracted by means of a hand lever 158 (Fig. 8) operatively connected to a member 158[a] and a shaft 160 (Figs. 8, 9, 15, 16) for the purpose of bringing said driver out of reach of the cams 155 and of disconnecting the drum 150 from its driving mechanism. As will be seen later on, no reversing movement takes place in this case. I prefer to provide also additional means to permit the starting of this reversing movement by hand, as on the cutting of the first teeth of a blank the cutter has to be moved from the side toward said blank until several teeth of the cutter of rack form are able to cut before any reversing movement may be imparted to the blank.

The spur-wheel 156 receives its drive through the wheels 161, 162, 163 (Fig. 8), while the spur-wheel 157 is operatively connected to the wheels 164, 165, 166. Wheels 163 and 166 are fixed to the sleeves 167 and 168 of the bevel-wheels 135 and 136 respectively, having on their inner side clutch-teeth. These teeth are adapted to mesh alternately with two clutch-sleeves 169 and 170 (Fig. 8) mounted on the shaft 140 between the sleeves 167 and 168, the sleeve 169 being rigidly connected to the sleeve 134[a], while the sleeve 170 is adapted to be moved in a key-way of the shaft 140. A bevel-wheel 137 fixed to the shaft 141 meshes with the two bevel-wheels 135 and 136. Shaft 141 is, as already stated, operatively connected to the shaft 26 by means of change-wheels 141[a], 141[b] (Figs. 7, 8) adapted to be moved into the operative position by means of a hand lever 142 (Figs. 1 and 4), shaft 143 (Figs. 7, 9) and a fork-like member 144, the speed of the momentary rolling movement, and therefore also the number of the pitches of the blank rolled past the cutter 104[a] during a course of work of the machine, depending on the diameter of the change-wheels, which are just brought into the operative position.

The members for effecting the reversing movement are driven by a pulley 174 (Figs. 2, 7, 8), which is driven in its turn by a pulley 173 (Figs. 2, 3) fixed to the main shaft 62. The shaft of the pulley 174 carries on the other end a pinion 175 (Fig. 8) meshing with a toothed wheel 176 and the latter engages in its turn with a toothed wheel 177 fixed to the above mentioned shaft 140 (Fig. 8). On a rotation of the control drum 150 the cam F of the latter acts upon a lever 178 (Figs. 12, 7, 8, 9), which is fixed to the shaft 27 already referred to, so that a small oscillating movement is then imparted to said lever 178 and therefore also to this shaft 27. This influences the parts 44, 41, 40, 39 (Figs. 19, 21) in such a manner, that the ring 37 acting as a bearing for the planet bevel-gearing arranged in the table box is released, so that the revolving movement of the table carrying the blank is interrupted.

The cams A and B (Figs. 12, 13) of the drum 150 are adapted to push aside a lever 179 (Fig. 7), which imparts thereby a rotation to a vertical pin 180 and a lever 181. The latter forms a toggle-lever, which is acted upon by a spring. As this lever 181 is also adapted to oscillate about a gudgeon 182 (Figs. 7, 8), the lever 179 has to be moved by said cams A and B only a little out of its middle position, as the spring acting upon the toggle-lever 181 afterward effects the further rotation of said lever 179. The latter is rotated at first a small amount in order to tension said spring acting upon the toggle-lever 181 and only after this has been effected it acts either upon a pin 183 or 184 (Fig. 10) of a lever 185 (Figs. 10, 7). The lever 185 having a fork-shaped part 185[a] (Fig. 10) causes that one of the two clutch-sleeves 169, 170, which is just clutched to one of the bevel-wheels 135 or 136 to disengage said wheel, while the other one of said sleeves is then clutched to the corresponding bevel-wheel. Thus it will be seen, that bevel-wheel 137 imparts to the shaft 141, and therefore also to shaft 26, a determinate direction of rotation, to which corresponds a determinate rolling movement of the table carrying the blank. Moreover, the lever 185 is able to pivot only to a certain amount in the direction toward the pulley 174 after lever 179 has been acted upon by cam B, as its hook-like projection 186 (Fig. 10) engages with a projection 187[a] (Fig. 11) of a lever 187 upon the oscillation of said lever 185 through a certain angle. Said lever 185 may be moved wholly to the left and cause a clutching of one of said sleeves 169, 170 only upon a falling of the lever 187. The falling of this lever 187 is brought about by a cam 206 (Fig. 5) fixed to the shaft 68[a] and acting upon the lever 187 through a mechanism described more fully later on. As the movement of the control drum 150 has to be independent of the cutter movement and the feed movement and as the reversing movement has to begin while the ram 97 is in its uppermost position, I use the cam shaft 68[a] effecting the movement of the ram for imparting a downward movement to the lever 187 in order to control the beginning of the reversing movement.

A recess in the cam D (Fig. 12) of the drum 150 admits an inward movement of a bolt 188 (Figs. 9, 7, 13) acted upon by a spring, which movement causes a rotation of a lever 189 (Figs. 7, 8), a pin 190 and a clutch lever 191 (Fig. 2), so that a clutch-member 192 (Figs. 2, 8, 9) fixed to the shaft 140 is caused to mesh with the spur-wheel 134. In this case the wheel 134 is no longer driven by the feed-wheel 131 (which is now stationary), but it is then moved at the same speed of rotation as the shaft 140, which is moved in a uniform manner by the reversing pulley 174 through toothed wheels 175, 176, 177 (Fig. 8). It is evident, that in this case also feed-wheel 131 has to take part in the quick movement of the wheel 134, whereby the feed pawl 130 slides over the teeth of said wheel 131. Moreover, also shaft 141 and therefore also shaft 26 as well as the drum 150 have a greater speed of rotation than usual.

The cam C (Fig. 12) of the drum 150 is adapted to lift the lever 187, which causes thereby a rotation of a shaft 194 (Figs. 11, 12, 5 and 6) and an upward movement of a lever arm 195 (Figs. 6, 5). The latter is operatively connected to a vertical rod 196 acted upon by a spring and pivoted to a lever 197 (Fig. 5), which may be caused to oscillate by said rod 196, in order to act upon the part 61 of the friction clutch 60, 61. An oscillation of said lever 197 causes at the same time a rotation of a segment 255 (Figs. 5, 30), which meshes with a toothed segment 255[a] (Fig. 30) operatively connected to a brake band 200, so that the latter will be untensioned or tensioned according to the direction of rotation of the segment 255. These different parts are secured in the position shown in Fig. 5 by the edge 201 (Fig. 5), which the pawl 202 acted upon by a spring 203 (Fig. 5) is caused to engage as soon as the rod 196 is lifted. While such a lifting takes place a stop 204 (Fig. 5) is moved somewhat toward the disk 205 (Fig. 6) fixed to the cam shaft 68[a], but it is not yet able to come in contact with a cam 206 (Figs. 5, 6). Only a lifting of a rod 207 effected by the cam E of the drum 150 through the lever 208, shaft 209 (Fig. 5, 6), lever 210 (Figs. 11, 12, 13), causes said stop 204 to engage with the cam 206.

In order that the stop 204 may be moved only at a certain predetermined interval during a rotation of the shaft 68[a] toward the disk 205 I provide a suitable locking mechanism, which comprises a lever 211 (Fig. 5), acting once during each revolution of the cam shaft 68[a] upon a spring bolt 212, and a pawl 213 connected to the latter. According to the position of this pawl 213 the stop 204 is either locked in a determinate position or it is then released.

A rotation of the lever 197 (Fig. 5), that is a rotation of the projection 214 of this lever, allows also a rotation of the cam 215. The latter is caused to oscillate by a spring 216 (Fig. 2), which is mounted on the shaft of a handle 217 (Figs. 2, 4) and which acts on a mechanism, transmitting the pressure of said spring to the cam 215 in the direction of the arrow 218 (Fig. 5). Thus, the cam 215 serves to control the starting of the machine, while the stop 219 serves to control the stopping of the machine. In Figs. 1, 5 and 6 it will be seen, that the movement of the cam 215 in the direction of the arrow 218 influences the machine in the same manner as the lifting of the lever 187. When the machine has to be stopped by hand, the shaft 220 is moved in the direction of the arrow 221 (Fig. 5), the stop 219 pressing on the lever 222, so that the small pawl 202 releases the rod 196, which is then pressed downward, owing to the action of its spring, causing thereby a throwing out of gear of the friction clutch 60, 61 and a tensioning of the brake band 200. As the handle 217 through the stop mechanism acts on the brake, it is clear that the machine can only be stopped by this handle during the cutting and not during the reversing period, at which time the clutch is already released.

The toothed clutch 224 (Fig. 6) operatively connected to the member 121 may be put out of action by means of lever 223 (Figs. 2, 5, 6) in which case said spur- and bevel-wheel 121 (Fig. 6) is no longer rigidly connected to its shaft. The feed crank-plate 124 can thus be displaced without the disk of the shaft 68[a] effecting a movement of the ram being rotated, so that the point of time, at which the feed takes place, may be adapted in any suitable manner to the cutter stroke.

The blanks are centered as a rule on a mandrel of the table 19 and they are clamped tightly by a nut.

I shall now explain the working of the hereinbefore described machine. This may be best explained by the description of one complete course of work of the machine.

The sequence and the duration of the different table movements are illustrated diagrammatically in Fig. 14. As all these movements are controlled by the drum 150 I reserve for each operation a certain stretch of a revolution of the drum, it being understood, that the drum describes one complete revolution during a complete course of work of the machine.

The table 19 supporting the blank carries out the following movements:

(1) During 1/20 of a drum revolution: A backward rolling movement.

(2) During 4/10 of a drum revolution: A backward travel past the cutter (without rotation).

(3) During 1/20 of a drum revolution: A second backward rolling movement.

(4) During 1/10 of a drum revolution: A forward rolling movement.

(5) During 4/10 of a drum revolution: A step by step forward rolling movement.

It is thereby asumed, that the forward direction is the direction of movement during the cutting period.

Movements (1), (2) and (3) constitute the reversing movement, movement (4) serves to take up the play and movement (5) constitutes the so-called cutting period.

Notwithstanding the fact, that only 4/10 of a revolution of the drum 150 are reserved for the cutting period, the time required for the reversing and the taking up of the play amounts only to about 1/10 of the time of a cutting period, as the drum 150 and the table 19 have during said four first movements a much greater speed than during the cutting period. For the rest, only the second and the fifth of these movements are theoretically absolutely necessary. As the blank, receiving during the cutting period a rolling motion is fed past the mutiple-tooth cutter of rack form to an amount corresponding to one or several whole pitches and as the cutter has but a limited length, the center of the blank has to be moved back into the original position, without the blank being rotated, as soon as a cutting period is finished. This is the reason why I impart to the table the movement (2). In order to obtain practically in a secure manner an accurate work I roll the table at first twice backward during 1/20, that is totally during 1/10 of a revolution of the drum beyond the starting position and afterward during 1/10 of a revolution of the drum 150 in a forward direction. The result of this is, that any play between the movable parts is eliminated in the direction of the forward rolling movement. Why I prefer to impart to the blank twice a backward rolling movement lasting each 1/20 of a revolution of the drum instead of only one such movement lasting 1/10 of a revolution of the drum I shall explain later on.

Let it be now assumed, that the machine is working at the end of the cutting period. The main driving shaft 62 drives the cam disk shaft 68[a], as the parts 60, 61 (Fig. 5) of the friction clutch mounted on this shaft 62 are in their operative position while the brake band 200 is not tensioned, so that a vertical reciprocating movement is imparted to the cutter, while a periodical revolving movement is imparted to the feed-wheel 131. Each short movement of this feed-wheel 131 is transmitted each time to the shaft 141 through the shaft 132 (Fig. 5) the spur-wheels 133, 134 and bevel-wheels 135, 137 (Fig. 8) and from said shaft to the shaft 26 mounted in the table box through the change-gearing 141[a], 141[b] (Figs. 7, 8). Said shaft 26 drives (according to the direction of rotation) either the bevel-wheel 29 or 30 as well as the bevel-wheel 31 and the spur-wheel 31[a] and therefore also the shafts 32 and 52. The latter transmit their drive to the shafts 21 and 11, 12 respectively through the two change-gearings 22[a], 22[b] (Fig. 31). These shafts impart then each time a small rolling movement to the table 19. Upon each rotation imparted to the feed-wheel 131 the drum 140 is also rotated in the direction of the arrow shown in Figs. 8, 12, 13 through the spur-wheels 133, 134, 163, 162, 161, 156, (Fig. 8). As I shall explain more fully later on this drum 150 can only rotate in the direction shown owing to the provision of the change-gearing 135, 136, 137.

It is evident, that bevel-wheel 136 is also moved on each feed stroke and hence also spur-wheels 166, 165, 164, 157. The latter rotates in a direction opposite to the direction of rotation of the drum driver 153. As, however, the cams 155 provided on the wheel 157 do not strike against the radial front part, but against the curved front side of the driver 153 (Fig. 18), the latter is only moved inward, so that the cams 155 may slide over this driver 153 on a rotation of the wheel 157. Shortly before the last feed stroke of the cutting period is carried out the cam E of the drum 150 is just passing beneath the projection of the lever 210, which by reason of spring 207[a] on rod 207 (Fig. 5) is caused to enter the recess in cam E, so that the rod 207 (Fig. 5) is lifted against the action of its spring 207[a], while the stop 204 is oscillated about the pivot 252 and thus moved within reach of the cam 206. The last feed stroke has the effect of moving the beginning of the cam B of the drum 150 beneath the lever 179, which is thus pushed aside by said cam. Owing to this, the clutch sleeve 169 (Figs. 7, 8) is caused to disengage the bevel-wheel 135, so that the drum 150 ceases to rotate. At the same time the lever 185 (Fig. 10) causes a tensioning of the spring of the toggle-lever 181 (Fig. 7) without the latter being, however, able to move wholly toward the other side, as the nose 187[a] of the lever 187 prevents for the time being a further rotation of said lever 185. In the meantime the cam 206 (Fig. 5) on the cam disk shaft 68[a] is moved beneath the stop 204, which is just rotated about the pin 253 (Fig. 5) at the moment at which the ram 97 reaches its uppermost position. The rod 254 (Fig. 5) is thus raised, the right hand end of crank lever 222 is depressed and the pawl 202 is moved away from the edge 201. The rod 196 is now depressed owing to the action of its spring and lever 197 throws the friction clutch 60, 61 out of gear and tensions the brake band 200 by means of the bevel-wheel segments 255 and 255[a] (Fig. 30), so that the main shaft 62 and therefore also the movements of the cutter and the feed movement are suddenly stopped. Moreover, the cam 215 is moved in the opposite direction of arrow 218 (Fig. 5) and the hand operated stopping device comprising handle 217 (Figs. 2, 4) is released. A few moments after the moving of stop 204, the cam E again acts on the projection of the lever 210 and presses the lever down as well as rod 207.

The falling of the rod 196 causes also an oscillation of the lever 187 toward the drum 150, so that the tensioned spring of the toggle-lever 181 (Figs. 7, 8) exerts now its action upon the latter, which is oscillated and clutches the sleeve 170 to the bevel-wheel 136. As, however, the reversing pulley 174, and therefore also the shaft 140, are constantly rotated in the same direction, the bevel-wheel 136 rotates with the same speed of rotation as the shaft 140 and it transmits its movement to the shaft 26 through the change-gear 141[a], 141[b]. This shaft 26 is, however, moved in the opposite direction, so that it imparts to the table 19 backward rolling movement. The bevel-wheel 136 drives now the spur-wheels 166, 165, 164, 157 (Fig. 8). The latter actuates the driver 154 and thus also the drum 150, which is rotated in the same direction as before. Upon 1/20 of a revolution of the drum 150 the cam F of this drum pushes the lever 178 aside, so that the shaft 27 mounted in the table box is rotated. Owing to this, the lever 46 (Fig. 21) in the table box is raised and the pin 39 of the lever 40 (Fig. 19) is withdrawn from the recess 38 of the planet ring 37. The constantly rotating shaft 32 is then prevented from driving the wheel 34 (Fig. 20), but it drives now the ring 37 together with its two bevel-wheels 35 and 36. Thus, the backward rolling movement of the table 19 is arrested as the wheel 54, and therefore the shaft 21, are no longer rotated and the table 19 carries out only a backward travel. This travel lasts 4/10 of a revolution of the drum, the planet ring 37 completing during this time just one revolution, whereupon its recess 38 is again moved beneath the pin 39. In the meantime the cam F has been moved farther and the springs 43 and 45 push after a certain time interval the pin 39 again into the recess 38, so that the planet ring 37 is arrested, while the shaft 27 and the lever 46 are returned into their earlier position. As soon as the planet ring 37 is held fast, the bevel-wheel 34 is of course again rotated, so that the table 19 receives a backward revolving movement. As the straight backward travel of the table has not yet been interrupted, a new backward rolling movement is then imparted to the table 19 lasting 1/20 of a revolution of the drum 150. Thus, the two backward rolling movements lasting each 1/20 of a drum revolution are completed and I shall now explain why I prefer to choose two such movements lasting each 1/20 of a revolution of the drum instead of only one lasting 1/10. The reason therefore is, that I wish to be quite certain that the pin 39 of the lever 40 engages in a sure manner the recess of the planet ring 37. If the first backward rolling movement would last 1/10 instead of 1/20 of a revolution of the drum, the planet ring 37 would just change its direction of rotation on the completion of the backward travel lasting 4/10 of a drum revolution at the moment, at which the pin 39 should engage the recess 38, so that this pin 39 would have only a very short time interval at its disposal for engaging said recess. Shortly before the second backward rolling movement is completed, a recess of the cam D of the drum 150 is moved in front of the bolt 188 (Fig. 9), which is pressed into said recess by a spring causing thereby the throwing into gear of the clutch 192 (Fig. 8), so that the spur-wheel 134 and the toothed sleeve 169 are now rigidly connected to the shaft 140.

At the beginning of the movement serving to take up the play the cam A of the drum 150 moves the lever 179 toward the side of the pulley 174, coupling thereby the sleeve 169 to the sleeve of the bevel-wheel 135. As the sleeve 169 is at this time also connected to the constantly revolving shaft 140 by means of the afore-mentioned clutch ~~192,~~ the bevel-wheel 135 has now the same speed of rotation as the shaft 140 and it drives besides the bevel-wheel 137 the shafts 141 and 26, but, as will be seen in Fig. 8, in the opposite direction, so that a forward rolling movement is imparted to the table 19, which lasts, as already mentioned, 1/10 of a revolution of the drum 150. While this movement is taking place, the rotation of the spur-wheel 134 causes also a quick movement of the feed-wheel 131, the teeth of which may move unhindered beneath the pawl 130. In the meantime the recess in the cam D has been moved through a certain angle and the bolt 188 is then again pressed out of said recess and the clutch 192 thrown out of gear, so that the clutch-sleeve 169 is uncoupled from the shaft 140. The drum 150 and the table 19 would now remain stationary, but as the cam C of the drum 150 has again been moved within reach of the lever 187, the latter, and therefore also the rod 196, are raised, imparting thereby an oscillation to the lever 197, so that the brake band 200 is untensioned and the friction clutch 61, 62 thrown into gear, whereupon the movement of the ram 97 and the feed movement are again started, that is, a new cutting period is started. At the same time the spring 203 causes the pawl 202 to engage the edge 201, so that the rod 196 is fixed in a determinate position. An oscillation of the lever 214 causes also an oscillation of the crank lever 215, which returns the hand operated stopping device into the starting position. Now, it will be seen, that the different parts of the machine take then up the same positions as it has been assumed they had, when I started to describe the working of the machine, that is, the machine has now completed a course of work. During this time the blank has been rolled past the multiple-tooth cutter of rack form to an amount corresponding to an integer number of pitches.

What I claim is:

1. In a gear cutting machine, a multiple tooth cutter of rack form, a reciprocable holder therefor, a blank carrier, means for rolling the blank past the cutter an integral number of pitches during the cutting operation, means for arresting the rolling of the blank at a predetermined point, and means for moving the blank back past the cutter a distance equal to the rectilinear travel of the before-mentioned rolling movement.

2. In a gear cutting machine, in combination, a multiple-tooth cutter of rack form, a reciprocating ram carrying said cutter, a blank-carrier and means adapted to impart to the latter a step by step rolling movement during the cutting operation past the cutter to an amount corresponding to an integer number of pitches and mechanism to effect between such succeeding operations an additional forward and backward rolling movement past the cutter to take up the play in said means for moving the blank-carrier, these additional movements being carried out with a greater speed than the movement of the blank-carrier during the planing operation.

3. In a gear cutting machine, in combination, a multiple-tooth cutter of rack form, a ram carrying the latter, a blank-carrier, an intermittently working main driving member imparting the movement to the cutter and the blank-carrier during the cutting operation and a constantly running auxiliary driving member moving only the blank-carrier during the period of reversing and during an additional movement for taking up the play in the mechanism.

4. In a gear-cutting machine, in combination, a cutter, a ram carrying the latter, a movable blank-carrier, means adapted to move said ram and blank-carrier and a central control-drum adapted to control said means, substantially as described.

5. In a gear-cutting machine in combination, a cutter, a ram carrying the latter, a blank-carrier, a main drive, a cam-disk shaft intermittently driven by the main drive, means actuated by said shaft for moving the ram and the blank carrier, a central control drum for controlling the movements of said means and means for driving said drum by said shaft during the cutting operation.

6. In a gear-cutting machine, in combination, a cutter, a ram carrying the latter, a blank-carrier, a main drive, means actuated by the main drive for moving said ram and the blank-carrier, a drum for controlling the movements of said means and an auxiliary drive and auxiliary means adapted to move the control drum during the movements outside the cutting operation, substantially as described.

7. In a gear-cutting machine, in combination, a multiple-tooth cutter of rack form, a ram carrying the latter, a blank-carrier, a main driving member, a cam-disk shaft intermittently driven by said member, means actuated by said cam-disk shaft for moving the ram, means actuated by said shaft for imparting to the blank-carrier during the cutting operation a rolling movement past the cutter to an amount corresponding to an integer number of pitches, a constantly running auxiliary drive having a greater speed of rotation than said intermittently driven shaft and adapted to impart a straight reversing movement to the blank-carrier and a movement adapted to take up the play in the means moving the blank-carrier and a control-drum controlling the movements of all said means, said drum being driven during the cutting operation by said intermittently driven member and during the reversing movement of the blank-carrier and said movement adapted to take up the play by said auxiliary drive, substantially as described.

8. In a gear-cutting machine, in combination, a cutter, a ram carrying the latter, a blank-carrier, means for moving said ram and blank-carrier and a drum for controlling said means and effecting one complete revolution during one course of work of the machine, substantially as described.

9. In a gear-cutting machine, in combination, a cutter, a ram carrying the latter, a blank-carrier, means for moving said ram and blank-carrier and a drum for controlling said means rotating only in one direction, while the means controlled by it revolve in different directions, substantially as described.

10. In a gear-cutting machine, in combination, a cutter, a ram carrying the latter, a blank-carrier, means for moving the carrier and ram, a drum for controlling said means and adapted to be driven by the latter, and hand operated means for disconnecting the drum from said driving means without interrupting or influencing the momentary movement of the blank-carrier, substantially as described.

11. In a gear-cutting machine, in combination, a cutter, a ram carrying the latter, a blank-carrier, means for moving said blank carrier comprising a feed shaft, a group of change gearings for imparting a traveling movement to the blank-carrier and a second group of change gearings for imparting a revolving movement to said carrier, and means for automatically operating the first said group of change gearings alternately in opposite directions, substantially as described.

12. In a gear-cutting machine, in combination, a cutter, a ram carrying the latter, a blank-carrier, means for moving said blank-carrier comprising two groups of change-gearings adapted to impart to the blank-carrier a revolving and a forward and backward traveling movement respectively, and members adapted to automatically arrest the change-gearing effecting the revolving movement during the backward travel of the blank-carrier, substantially as described.

13. In a gear-cutting machine, in combination, a cutter, a ram carrying the latter, a blank-carrier, means for moving said ram and imparting to the blank-carrier a rolling movement, a revolving movement and a longitudinal travel, said means comprising a reversing gearing adapted to reverse by hand said rolling movement, the revolving movement and the longitudinal travel, substantially as described.

14. In a gear-cutting machine, in combination, a cutter, a ram carrying the latter, a blank-carrier, means for moving said ram and blank-carrier and hand operated means to interrupt at any time the movement of the blank-carrier without interrupting the movement of the ram, substantially as described.

15. In a gear-cutting machine, in combination, a cutter, a ram carrying the latter, a blank-carrier, means for moving said ram and imparting to the blank-carrier a rolling movement past the cutter, and hand operated means adapted to vary at any time the velocity of said rolling movement without stopping the machine, substantially as described.

16. In a gear-cutting machine, in combination, a cutter, a ram carrying the latter, a blank-carrier, means for moving said ram and blank-carrier comprising a worm shaft adapted to impart a revolving movement to the blank-carrier and a brake device on said worm shaft, substantially as described.

17. In a gear-cutting machine, in combination, a cutter, a ram carrying the latter, a blank-carrier, means for moving said ram, and mechanism for moving the blank-carrier comprising a drag spindle device adapted to take up the play in said mechanism, substantially as described.

18. In a gear-cutting machine, in combination, a cutter, a ram carrying the latter, a blank-carrier, means adapted to move said ram and impart to the blank-carrier a rolling movement past the cutter during the cutting operation, a reversing movement and a movement for taking up the play in the means for moving the blank-carrier during the interruption of the cutting operation and means adapted to arrest the ram and its driving mechanism during the reversing movement and the movement for taking up the play outside the blank in order to prevent the cutter from engaging the blank, substantially as described.

19. In a gear-cutting machine, in combination, a cutter, a ram carrying the latter, a blank-carrier, means for moving said ram and the blank-carrier, a central drum for controlling said means, means adapted to arrest the ram while the blank-carrier is moved, and means controlled by said drum adapted to prepare the arresting of the ram, substantially as described.

20. In a gear-cutting machine, in combination, a cutter, a ram carrying the latter, a blank-carrier, means for moving said ram and the blank-carrier, a central drum for controlling said means, means adapted to arrest the ram while the blank-carrier is moved, means controlled by said drum adapted to prepare the arresting of the ram, and members adapted to lock the last mentioned means while the cutter is within the blank, substantially as described.

21. In a gear-cutting machine, in combination, a cutter, a ram carrying the latter, a blank-carrier, means for moving said ram and blank-carrier comprising a main drive, a cam-disk shaft and a clutch adapted to transmit the movement of the main drive to said cam-disk shaft, and means actuated by the latter to release the clutch and means to suddenly arrest the movement of the ram while the cutter is outside the blank and the clutch is released, substantially as described.

22. In a gear-cutting machine in combination, a cutter, a ram carrying the latter, a blank-carrier, means for moving said ram and blank-carrier comprising a main drive, a cam-disk shaft and a clutch adapted to transmit the motion of the main drive to said cam-disk shaft and a brake adapted to arrest immediately the movement of the ram on a throwing out of gear of said clutch, a central drum controlling said means, and means controlled by said drum adapted to throw said clutch into gear and release the brake for the purpose of restarting the ram movement, substantially as described.

23. In a gear-cutting machine, in combination, a cutter, a ram carrying the latter, a blank-carrier, means for moving said ram and imparting to the blank-carrier a rolling movement past the cutter during the cutting operation, a reversing movement and a movement for taking up the play in said means for moving the blank-carrier, and hand operated means to momentarily arrest at any time all of said movements, substantially as described.

24. In a gear-cutting machine, in combination a cutter, a ram carrying the latter, a blank-carrier, means for moving said ram and imparting to the blank-carrier a rolling movement past the cutter during the cutting operation, a reversing movement and a movement for taking up the play in said means for moving the blank-carrier, means for arresting the ram during the reversing movement of the blank-carrier and said movement for taking up the play, and locking means to prevent the starting of the reversing movement before the ram is arrested, substantially as described.

25. In a gear-cutting machine, in combination, a cutter, a ram carrying the latter, a blank-carrier, and means for moving said ram and the blank-carrier comprising a main drive, a cam-disk shaft driven by the latter and adapted to move the ram, a feed shaft for moving the blank-carrier, and a pair of elliptical toothed wheels for transmitting the movement of said cam-disk shaft to the feed shaft, substantially as described.

26. In a gear-cutting machine, in combination, a cutter, a ram carrying the latter, a blank-carrier, means for moving said ram and the blank-carrier comprising a feed mechanism having a feed link and a member manually adjustable relatively to said link, the feed movement being adapted to be varied while the machine is in operation on an adjustment of said member, substantially as described.

27. In a gear-cutting machine, in combination, a cutter, a ram carrying the latter, a blank-carrier and means for moving said ram and blank-carrier comprising a feed mechanism for the blank-carrier and a safety clutch adapted to stop said mechanism on the occurring of trouble, substantially as described.

28. In a gear-cutting machine, in combination, a cutter, a ram carrying the latter, a blank-carrier, means for moving the ram and the blank-carrier comprising a cam-disk shaft, a feed shaft operatively connected to the blank-carrier and adapted to be driven by said cam-disk shaft and a clutch between said shafts to permit the movement of the ram to vary relatively to the movement of said cam-disk shaft in order to bring the ram movement in accordance with the blank-carrier movement, substantially as described.

29. An automatic gear cutting machine comprising in combination, a blank-carrier, a tool holder normally reciprocating in a fixed path and adapted to hold a cutter of the rack type, means for rolling the carrier forward with respect to the tool holder to effect the generation of gear teeth on the blank, means for moving the carrier rectilinearly backward through a distance equal to an integral number of pitches, and means for interrupting the normal operation of the tool holder with relation to the blank-carrier after each forward rolling movement and for starting the said normal operation after each backward rectilinear movement.

30. An automatic gear cutting machine comprising in combination, a blank-carrier, a tool holder normally reciprocating in a fixed path and adapted to hold a cutter of the rack type, means for rolling the carrier forward with respect to the tool holder to effect the generation of gear teeth on the blank, means for moving the carrier rectilinearly backward through a distance equal to an integral number of pitches, and means for stopping the reciprocation of the tool holder after each forward rolling movement and for starting the said reciprocation after each backward rectilinear movement.

31. An automatic gear cutting machine comprising in combination a blank-carrier, a tool holder reciprocating in a fixed path and adapted to hold a cutter of the rack type, two controlling mechanisms acting successively and alternately, one mechanism serving to simultaneously turn the carrier forward and to move it rectilinearly forward whereby a forward rolling movement is effected and the other mechanism serving to turn the carrier backward and to move it rectilinearly backward, the backward rectilinear movement exceeding that necessary for backward rolling by an amount equal to an integral number of pitches, and means for interrupting the normal operation of the tool holder in relation to the blank-carrier at the end of each forward rolling movement and for starting the said normal operation after the beginning of each succeeding forward rolling movement.

32. An automatic gear cutting machine comprising in combination, a blank-carrier, a tool holder reciprocating in a fixed path and adapted to hold a cutter of the rack type, two controlling mechanisms acting successively and alternately, one mechanism serving to simultaneously turn the carrier forward and to move it rectilinearly forward whereby a forward rolling movement is effected and the other mechanism serving to turn the carrier backward and to move it rectilinearly backward, the backward rectilinear movement exceeding that necessary for backward rolling by an amount equal to an integral number of pitches, and means for stopping the reciprocation of the tool holder after each forward rolling movement and for starting the said reciprocation after each backward rectilinear movement.

33. An automatic gear cutting machine comprising in combination, a blank-carrier, a tool holder reciprocating in a fixed path and adapted to hold a cutter of the rack type, two controlling mechanisms acting successively and alternately, one mechanism serving to simultaneously turn the carrier forward and to move it rectilinearly forward whereby a forward rolling movement is effected and the other mechanism serving to roll the carrier backward and to move it rectilinearly backward without rolling by an amount equal to an integral number of pitches, and means for interrupting the normal operation of the tool holder in relation to the blank-carrier at the end of each forward rolling movement and for starting the said normal operation after the beginning of each succeeding forward rolling movement.

34. An automatic gear cutting machine comprising in combination, a blank-carrier, a tool holder reciprocating in a fixed path and adapted to hold a cutter of the rack type, a reversible operating means serving to simultaneously turn the carrier forward and to move it rectilinearly forward whereby a forward rolling movement is effected and to reverse the said movements whereby backward rolling is effected, means for interrupting the backward turning but not the backward rectilinear movement by an amount equal to an integral number of pitches, and means for interrupting the normal operation of the tool holder in relation to the blank carrier at the end of each forward rolling movement and for starting the said normal operation after the beginning of each succeeding forward rolling movement.

35. An automatic gear cutting machine comprising in combination, a blank-carrier, a tool holder reciprocating in a fixed path and adapted to hold a cutter of the rack type, two controlling mechanisms acting successively and alternately, one mechanism serving to simultaneously turn the carrier forward and to move it rectilinearly forward whereby a forward rolling movement is effected and the other mechanism serving to roll the carrier backward and to move it rectilinearly backward without rolling by an amount equal to an integral number of pitches, the said backward rolling being effected both before and after the said backward rectilinear movement, and means for interrupting the normal operation of the tool holder in relation to the blank-carrier at the end of each forward rolling movement and for starting the said normal operation after the beginning of each succeeding forward rolling movement.

36. An automatic gear cutting machine comprising in combination, a blank-carrier, a tool holder reciprocating in a fixed path and adapted to hold a cutter of the rack type, a reversible operating means serving to simultaneously turn the carrier forward and to move it rectilinearly forward whereby a forward rolling movement is effected and to reverse the said movements whereby backward rolling is effected, means for interrupting the backward turning but not the backward rectilinear movement by an amount equal to an integral number of pitches, the last said means acting after the beginning and before the end of the said backward rolling movement, and means for interrupting the normal operation of the tool holder in relation to the blank-carrier at the end of each forward rolling movement and for starting the said normal operation after the beginning of each succeeding forward rolling movement.

37. An automatic gear cutting machine comprising in combination, a blank-carrier, a tool holder reciprocating in a fixed path and adapted to hold a cutter of the rack type, two controlling mechanisms acting successively and alternately, one mechanism serving to simultaneously turn the carrier forward and to move it rectilinearly forward whereby a forward rolling movement is effected and the other mechanism serving to turn the carrier backward and to move it rectilinearly backward at increased speed, the backward rectilinear movement exceeding that necessary for backward rolling by an amount equal to an integral number of pitches, and means for interrupting the normal operation of the tool holder in relation to the blank-carrier at the end of each forward rolling movement and for starting the said normal operation after the beginning of each succeeding forward rolling movement.

38. An automatic gear cutting machine comprising in combination, a blank-carrier, a tool holder reciprocating in a fixed path and adapted to hold a cutter of the rack type, two controlling mechanisms acting successively and alternately, one mechanism serving to simultaneously turn the carrier forward and to move it rectilinearly forward whereby a forward rolling movement is effected and the other mechanism serving to turn the carrier backward and to move it rectilinearly backward at increased speed, the backward rectilinear movement exceeding that necessary for backward rolling by an amount equal to an integral number of pitches, means for interrupting the normal operation of the tool holder in relation to the blank-carrier at the end of each forward rolling movement and for starting the said normal operation after the beginning of each succeeding forward rolling movement, and means for causing the initial part of the forward rolling movement to take place at increased speed.

39. An automatic gear cutting machine comprising in combination, a blank-carrier, a tool holder normally reciprocating in a fixed path and adapted to hold a cutter of the rack type, two threaded elements adapted respectively for turning and rectilinearly moving the blank-carrier to effect rolling, and means associated with one of the aforesaid elements and tending to drive the carrier at an increased speed, the said element thus acting as a retarding device.

40. An automatic gear cutting machine comprising in combination, a blank-carrier, a tool holder normally reciprocating in a fixed path and adapted to hold a cutter of the rack type, two threaded elements adapted respectively for turning and rectilinearly moving the blank carrier to effect rolling, and a suplemental threaded element associated with one of the aforesaid elements for taking up play.

41. An automatic gear cutting machine comprising in combination, a blank carrier, a tool holder normally reciprocating in a fixed path and adapted to hold a cutter of the rack type, two threaded elements adapted respectively for turning and rectilinearly moving the blank carrier to effect rolling, a supplemental threaded element associated with one of the aforesaid elements and tending to drive the carrier at an increased speed to take up play, and non-positive means for rotating the supplemental threaded element.

42. An automatic gear cutting machine comprising in combination, a blank-carrier, a tool holder normally reciprocating in a fixed path and adapted to hold a cutter of the rack type, means for rolling the carrier forward with respect to the tool holder to effect the generation of gear teeth on the blank, means for moving the carrier rectilinearly backward through a distance equal to an integral number of pitches, two movable controlling devices, one operating in timed relation to the blank movements and the other operating in timed relation to the tool holder reciprocations, and means jointly controlled by the two devices for stopping the tool holder at the end of the forward rolling of the blank-carrier and at the end of a reciprocation with the tool disengaged from the blank.

43. An automatic gear cutting machine comprising in combination, a blank-carrier, a tool holder normally reciprocating in a fixed path and adapted to hold a cutter of the rack type, means for rolling the carrier forward with respect to the tool holder to effect the generation of gear teeth on the blank, means for moving the carrier rectilinearly backward through a distance equal to an integral number of pitches, two movable controlling devices, one operating in timed relation to the blank movements and the other operating in timed relation to the tool holder reciprocations, means for stopping the blank-carrier and the corresponding controlling device at the end of the forward rolling movement, and subsequently acting means jointly controlled by the two controlling devices for stopping the tool holder at the end of a reciprocation with the tool disengaged from the blank.

44. An automatic gear cutting machine comprising in combination, a blank-carrier, a tool holder normally reciprocating in a fixed path and adapted to hold a cutter of the rack type, a head in which the tool holder reciprocates, the head being angularly adjustable to change the angle of the path of reciprocation, means for rolling the carrier forward with respect to the tool holder to effect the generation of gear teeth on the blank, means for moving the carrier rectilinearly backward through a distance equal to an integral number of pitches, two movable controlling devices, one operating in timed relation to the blank movements and the other operating in timed relation to the tool holder reciprocations, means for adjusting the last said controlling means in accordance with the angular adjustment of the head, and means jointly controlled by the two devices for stopping the tool holder at the end of a reciprocation with the tool disengaged from the blank.

In testimony whereof I hereto affix my signature.

MAX MAAG.